US012666173B1

(12) United States Patent
Gao et al.

(10) Patent No.: US 12,666,173 B1
(45) Date of Patent: Jun. 23, 2026

(54) ADAPTIVE GAIN READOUT FOR VOLTAGE DOMAIN GLOBAL SHUTTER

(71) Applicant: OmniVision Technologies, Inc., Santa Clara, CA (US)

(72) Inventors: Zhe Gao, San Jose, CA (US); Tom Freson, Sunnyvale, CA (US); Hyunyong Jung, San Jose, CA (US); Myonglae Chu, San Jose, CA (US); Ling Fu, Cupertino, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 68 days.

(21) Appl. No.: 18/988,369

(22) Filed: Dec. 19, 2024

(51) Int. Cl.
| | |
|---|---|
| *H04N 25/771* | (2023.01) |
| *H04N 25/532* | (2023.01) |
| *H04N 25/616* | (2023.01) |
| *H04N 25/62* | (2023.01) |
| *H04N 25/65* | (2023.01) |
| *H04N 25/75* | (2023.01) |
| *H04N 25/78* | (2023.01) |

(52) U.S. Cl.
CPC ......... *H04N 25/771* (2023.01); *H04N 25/532* (2023.01); *H04N 25/78* (2023.01)

(58) Field of Classification Search
CPC .... H04N 25/771; H04N 25/532; H04N 25/78; H04N 25/77; H04N 25/616; H04N 25/62; H04N 25/65; H04N 25/75
See application file for complete search history.

(56) References Cited

U.S. PATENT DOCUMENTS

| | | | |
|---|---|---|---|
| 11,729,529 B1 * | 8/2023 | Gao | H04N 25/616 |
| 2022/0159203 A1 * | 5/2022 | Gao | H03M 1/56 |
| 2022/0191416 A1 * | 6/2022 | Fowler | H04N 15/616 |

* cited by examiner

*Primary Examiner* — Marly S Camargo

(57) ABSTRACT

A sample and hold circuit includes a pixel level connection coupled to a pixel cell. In a voltage domain global shutter operation, a reset voltage and a signal voltage are sampled and stored in a reset capacitor and a signal capacitor sequentially. In readout, the stored signal voltage is read out first to a comparing circuit to determine the best gain factor for the analog to digital converter (ADC) circuit to fully utilize the conversion range of the ADC to achieve a better signal to noise ratio. Once the better gain is determined and set for the ADC by comparing the signal voltage with a pre-determined threshold voltage, the same signal voltage is converted directly to become a digital signal value by the ADC. Then, the stored reset voltage is converted to a digital reset value by the ADC without changing the gain factor, to shorten the readout time.

19 Claims, 5 Drawing Sheets

ADAPTIVE GAIN READOUT FOR VOLTAGE DOMAIN GLOBAL SHUTTER

BACKGROUND INFORMATION

Field of the Disclosure

This disclosure relates generally to image sensors, and in particular but not exclusively, relates to sample and hold (S&H) circuitry and using the values stored in the S&H circuitry to assist image data readout from the analog to digital conversion (ADC) of an image sensor.

Background

Image sensors have become ubiquitous. They are widely used in digital still cameras, cellular phones, security cameras, as well as medical, automobile, and other applications. The technology used to manufacture image sensors has continued to advance at a great pace. For example, the demands of higher resolution and lower power consumption have encouraged the further miniaturization and integration of these devices.

Image sensors conventionally receive light on an array of pixels, which generates charge in the pixels. The intensity of the light may influence the amount of charge generated in each pixel, with higher intensity generating higher amounts of charge. Correlated double sampling (CDS) is a technique that is used with CMOS image sensors (CIS) to reduce noise from images read out from image sensors by sampling image data from the image sensors and removing undesired offsets sampled from reset value readings from the image sensors. In global shutter CIS design, S&H switches are used to sample and hold signal (SHS) readings, as well as sample and hold reset (SHR) readings from the image sensors. The SHR and SHS switches in the S&H circuitry are controlled to sample the reset levels and the signal levels from the image sensor respectively. Ideally, during a global sampling phase, all S&H switches toggle at the same time to sample the whole frame from the image sensor into storage capacitors. After the global sampling is completed, a row-by-row read out from the image sensor is performed to digitize the sampled reset and signal levels. The digitized difference between the reset and signal levels are used in the CDS calculation to recover the true image signals. To further reduce random noise, correlated multiple sampling (CMS) may be performed.

Implementing CDS reduces the fixed pattern noise (FPN) and other temporal noise, such as kT/C thermal noise, from the image data. Correlated double sampling (CDS) and correlated multiple sampling (CMS) may be done in either analog domain or digital domain.

Voltage domain global shutter (VDGS) pixel array normally uses at least two storage capacitors as memories for the reset voltage value RESET and signal voltage value SIGNAL for CDS, three or more storage capacitors as memories for equal or more than one RESET value and equal or more than one SIGNAL for CMS. To satisfy small kT/C thermal noise requirement, the two storage capacitors need to maintain large enough layout size for a typical capacitance value of a few tens of fF.

A system for digital correlated double sampling for an image sensor having a plurality of pixels includes: an analog-to-digital convertor (ADC) stage for converting analog data into digital image data and outputting reset data; memory for storing both the digital image data and the reset data; and a digital correlated double sampling (DCDS) stage for generating digitally correlated double sampled image data based upon the subtraction between the digital image data and the digital reset data.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
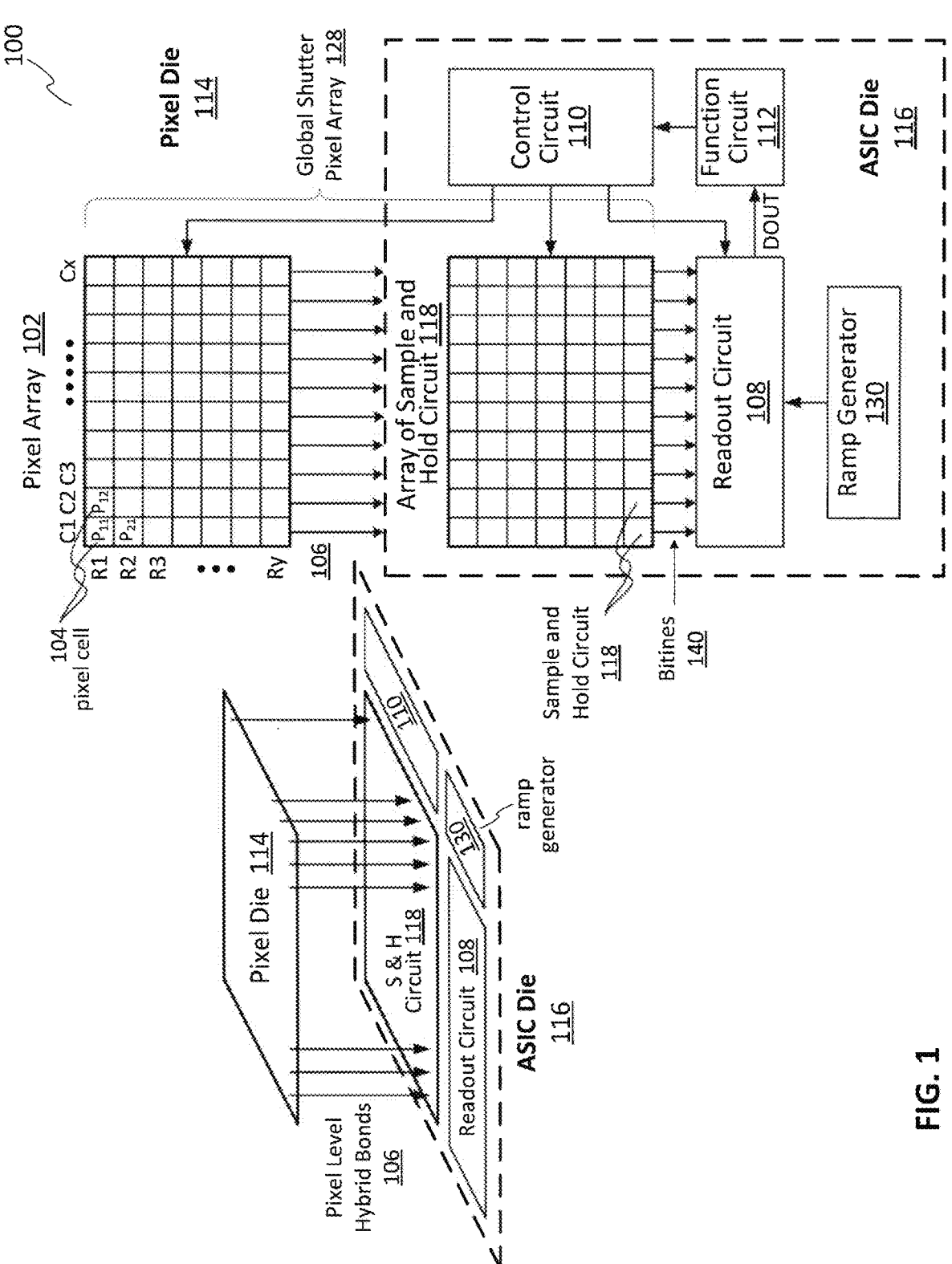
FIG. 1 illustrates one example of an imaging system in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples directed to a sample and hold (S&H) circuit and an analog to digital conversion (ADC) circuit for use in an image sensor are described herein. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

FIG. 1 illustrates one example of an imaging system 100 in accordance with an embodiment of the present disclosure. As shown in the example depicted in FIG. 1, imaging system 100 is implemented as a CMOS image sensor (CIS) in a stacked chipped scheme that includes a pixel die 114 stacked with a logic die or application specific integrated circuit (ASIC) die 116. In the example, the pixel die 114 includes a pixel array 102, and the ASIC die 130 includes an array of S&H circuits 118 that are coupled to the pixel array 102 through pixel level connections 106. ASIC die 116 also includes control circuitry 110, readout circuit 108, and function circuit 112. In one example, pixel array 102 is a two-dimensional (2D) array of photodiodes, or image sensor pixel cells 104 (e.g., pixels P1, P2 . . . , Pn). As illustrated, photodiodes are arranged into rows (e.g., rows R1 to Ry) and columns (e.g., column C1 to Cx) to acquire image data of a person, place, object, etc., which can then be used to render a 2D image of the person, place, object, etc. However, photodiodes do not have to be arranged into rows and columns and may take other configurations.

In one example, readout circuit 108 may be coupled to read out image data from the plurality of photodiodes 104 in pixel array 102 through the sample and hold (S&H) circuit 118. As will be described in greater detail below, in one example, the S&H circuit 118 includes a plurality of S&H circuits that are coupled to the pixel cells 104 at the pixel level to S&H reset values as well as signal values from pixel array 102 through pixel level connections 106. The image data that is readout by readout circuit 108 may then be transferred to function circuit 112. In various examples, readout circuit 108 may also include amplification circuit, analog to digital conversion (ADC) circuit coupled to the bitlines 140 of the S&H circuit 118, and a ramp generator 130 that works with the ADC.

In one example, function circuit 112 may simply store the image data or even manipulate the image data by applying post image effects (e.g., crop, rotate, remove red eye, adjust brightness, adjust contrast, or otherwise). In one example, readout circuit 108 may readout a row of image data at a time along readout column lines (illustrated) or may readout the image data using a variety of other techniques (not illustrated), such as a serial readout or a full parallel readout of all pixels 104 simultaneously.

In one example, control circuit 110 is coupled to pixel array 102 to control operation of the plurality of photodiodes in pixel array 102. As will also be described in greater detail below, control circuit 110 also includes a switch driver (not shown) internally that is coupled to generate the control signals to control the S&H circuit 118 to sample and hold the reset values and signal voltage values in the voltage domain (VD) from pixel array 102. In the depicted example, the control circuit 110 is also coupled to generate a global shutter signal for controlling image acquisition of all pixel values from the pixel array at substantially the same time, which may also be referred to as a voltage domain global shutter (VDGS). In one example, the shutter signal is such a global shutter signal for simultaneously enabling all pixel cells 104 within pixel array 102 to simultaneously capture their respective image data during a single acquisition window. In one example, image acquisition is synchronized with lighting effects such as a flash.

The pixel array 102, the pixel level connections 106, and the array of S&H circuit 118 forms a global shutter pixel array 128.

In one example, imaging system 100 may be included in a digital camera, cell phone, laptop computer, or the like. Additionally, imaging system 100 may be coupled to other pieces of hardware such as a processor (general purpose or otherwise), memory elements, output (USB port, wireless transmitter, HDMI port, etc.), lighting/flash, electrical input (keyboard, touch display, track pad, mouse, microphone, etc.), and/or display. Other pieces of hardware may deliver instructions to imaging system 100, extract image data from imaging system 100, or manipulate image data supplied by imaging system 100.

Figure 2:
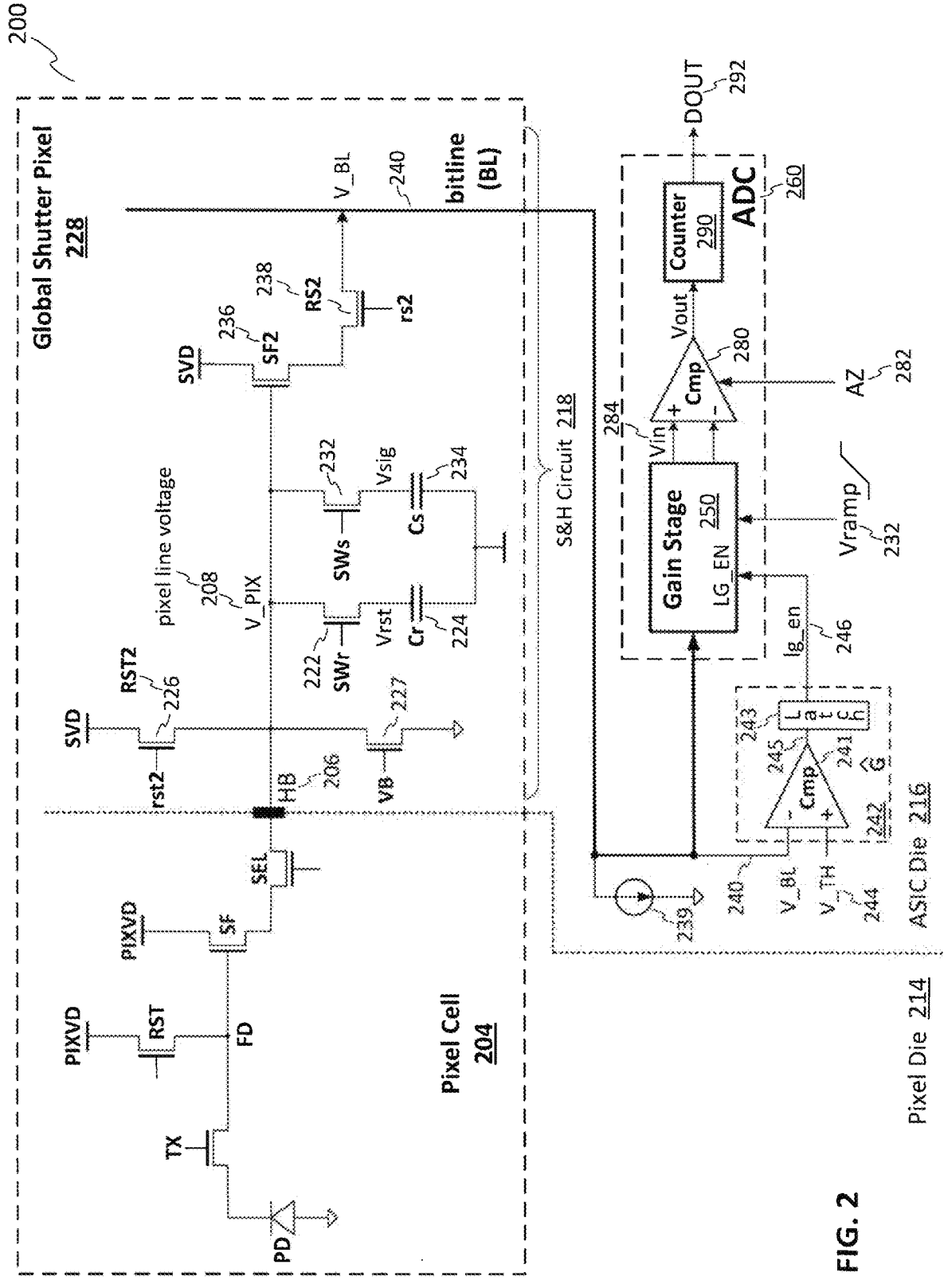
FIG. 2 shows a schematic of an example of pixel cell, an example sample and hold (SH) circuit, and an ADC with gain adaptive circuit in an image sensor in accordance with the teachings of the present invention.

FIG. 2 shows a schematic of an example of a pixel readout circuit 200 which includes an example of sample and hold (S&H) circuit 218 in an image sensor in accordance with the teachings of the present invention. It is noted that the pixel readout circuit 200 and its included S&H circuit 218 of FIG. 2 may be examples of one of the pixel cells 104 and one of the circuits of S&H circuit 118 described in FIG. 1, and that similarly named and numbered elements referenced below are coupled and function similar to those as described above. As shown in the depicted example, pixel cell 204 includes a photodiode (PD), which is coupled to photogenerate image charge in response to incident light. A transfer (TX) transistor is coupled to transfer the photogenerated image charge from the PD to a floating diffusion (FD) in response to a transfer signal TX. A reset (RST) transistor is coupled to a pixel voltage supply PIXVD to reset the FD in response to a reset signal to the RST transistor. The gate of a source follower (SF) transistor is coupled to convert the charge in the FD to an image data signal, which is coupled to be output through a select (SEL) transistor through a pixel level connection 206, such as a hybrid bond (HB), in response to a select signal to the SEL transistor.

In an imaging system that utilizes CDS, the charge on the FD is also read out through the pixel level connection 206 after a floating diffusion reset operation, in response to the reset signal to the RST transistor, to obtain a reset level, and the charge on the FD is also read out through the pixel level connection 206 after the image charge is transferred to the FD to obtain a signal level Continuing with the depicted example, the S&H circuit 218 includes a reset switch SWr transistor 222 that is coupled to the pixel line connection 206 to sample and hold a reset voltage Vrst from pixel cell 204 into a reset storage capacitor Cr 224 in response to a reset switch signal SWr. In addition, the S&H circuit 218 also includes a signal switch signal SWs transistor 232 that is coupled to the pixel level connection 206 to sample and hold a signal voltage Vsig from pixel cell 204 into a signal storage capacitor Cs 234 in response to a signal switch signal SWs 232.

The reset switch signal SWr and the signal switch signal SWs are generated and controlled by a switch driver (not shown) of the control circuit 110.

A second reset (RST2) transistor 226 is coupled between a supply voltage SVD and the pixel line connection 206. The RST2 transistor 226 is responsive to a second reset signal rst2. In the depicted example, a second source follower (SF2) transistor 236 having a gate is coupled to the pixel line connection 206. A second row select (RS2) transistor 238 is coupled between the SF2 transistor 236 and a bitline (BL) 240. The RS2 transistor 238 is responsive to a second row control signal rs2. In the depicted example, a voltage bias (VB) transistor 227 that is biased with a bias voltage VB is coupled between the pixel line connection 206 and ground. The VB transistor 227 serves as a sample and hold (S&H) current source. The S&H current source provides current to the SF transistor and the pixel line connection 206 with a typical value of a few tens of nA.

The BL 240 serves as an output of the global shutter pixel 228. A current source 239 is coupled between the bitline 240 and ground to provide current to the SF2 transistor. BL 240 carries a bitline voltage V_BL to a negative (inverting) input terminal "−" of a G-hat comparator 241 of a G-hat unit 242. A threshold voltage V_TH 244 is coupled to the positive (non-inverting) input terminal "+" of the G-hat comparator 241. The G-hat comparator 241 provides a low voltage at its output 245 if the value of V_BL is larger than V_TH (a darker pixel has a higher V_BL value), and a high voltage at its output 245 if the value of V_BL is lower than V_TH (a brighter pixel has a lower V_BL value). A G-hat latch 243 latches the output value of the G-hat comparator 241 by a G-hat latch enable signal from the control circuit 110 (not shown) at the moment of demand. The G-hat latch 243 provides an output 246 of the G-hat unit 242. The signal lg_en at the output 246 of the G-hat unit 242 serves as a control signal to enable a low gain to an analog-to-digital converter (ADC) 260. The ADC 260 comprises a gain stage 250, an ADC comparator 280, and an ADC counter 290.

The gain stage 250 of the ADC 260 is coupled to receive the bitline voltage V_BL from BL 240 as its input signal, the signal lg_en from the output 246 of the G-hat unit 242 as its low gain enable signal, a ramping voltage signal Vramp 232 generated by a ramp generator 130 (not shown), and an output Vin 284 to serve as an input signal to a positive (non-inverting) terminal "+" of the ADC comparator 280. The ADC comparator 280 is coupled to receive an ADC auto-zero (AZ) signal 282 from the control circuit 110 (not shown) to initiate the ADC 260 for its operation (to preset ADC 260 to get it ready for its conversion). As shown in FIG. 2, the ADC 260 has an output digital value DOUT 292 coupled to the function circuit 112 (not shown).

Figure 3A:
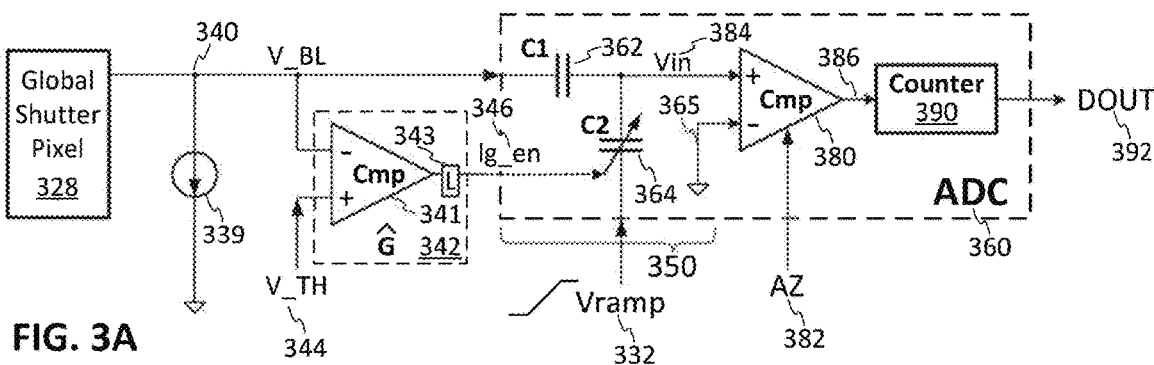
FIG. 3A is a schematic that shows a first embodiment of example ADC readout circuit with adaptive gain in accordance with the teaching of the present disclosure.
Figure 3B:
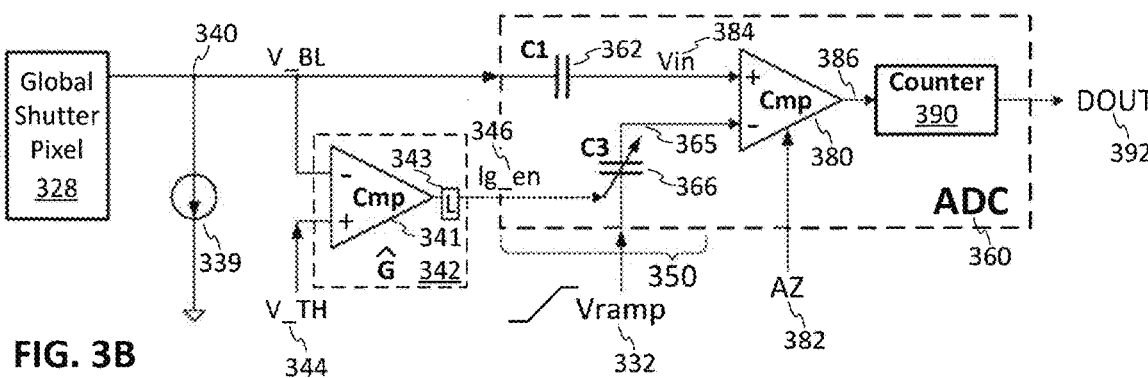
FIG. 3B is a schematic that shows a second embodiment of example ADC readout circuit with adaptive gain in accordance with the teaching of the present disclosure.
Figure 3C:
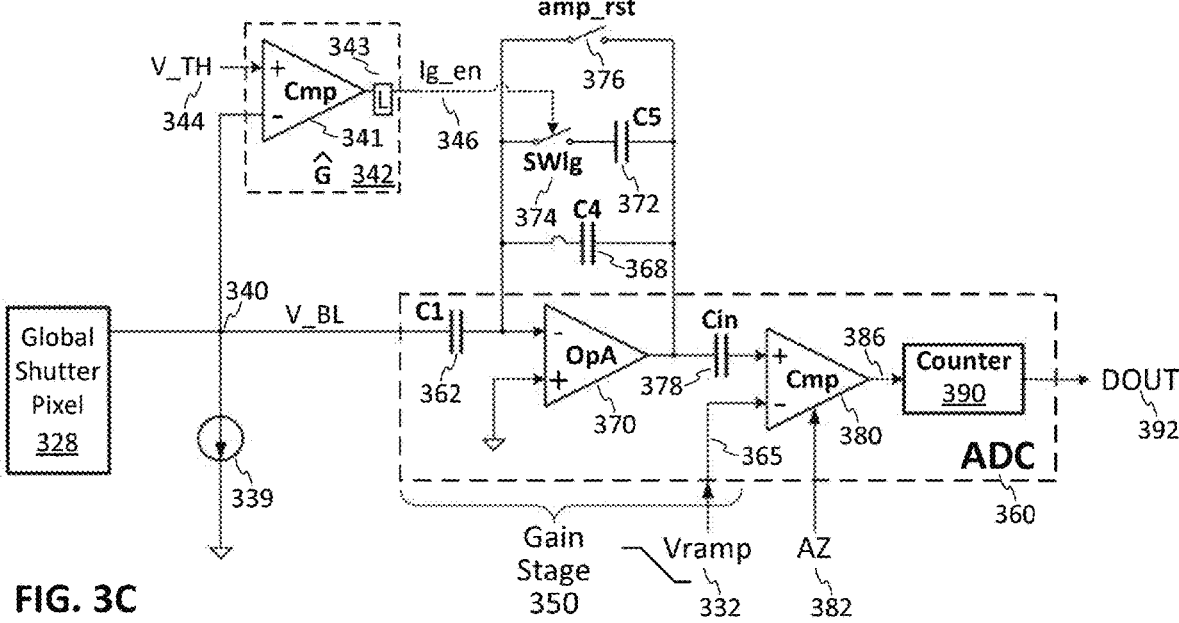
FIG. 3C is a schematic that shows a third embodiment of example ADC readout circuit with adaptive gain in accordance with the teaching of the present disclosure.

FIG. 3A, FIG. 3B, and FIG. 3C share some common portions with FIG. 2. In FIGS. 3A-3C, an output of a global shutter pixel 328 is a bitline (BL) 340. A current source 339 is coupled between the BL 340 and ground. BL 340 carries a bitline voltage V_BL to a negative (inverting) terminal "−" of a G-hat comparator 341 of a G-hat unit 342. A threshold voltage V_TH 344 is coupled to the positive terminal "+" of the G-hat comparator 341. The G-hat comparator 341 provides a low voltage at its output if the value of V_BL is larger than V_TH, (a darker pixel has a higher V_BL value), and a high voltage at its output if the value of V_BL is smaller than V_TH. A G-hat latch 343 latches the output value of the G-hat comparator 341 right after a Vsig as V_BL is compared with the V_TH. The signal lg_en at the output 346 of the G-hat unit 342 serves as an input signal to an analog-to-digital converter (ADC) 360. The ADC 360 comprises a gain stage 350, an ADC comparator 380, and a counter 390. The ADC comparator 380 and the counter 390 remain unchanged throughout FIGS. 3A-3C.

FIG. 3A is a first schematic example of a readout ADC circuit that comprises a G-hat unit 342 and an ADC gain stage 350 in accordance with the teaching of the present disclosure. The gain stage 350 comprises a first capacitor C1 362, a second capacitor C2 364, and a bypass wire 365. The bypass wire 365 offers connection between a negative terminal "−" of the ADC comparator 380 and ground. The C1 362 is coupled between the bitline 340 (carries the voltage value of V_BL) and a positive terminal "+" of the ADC comparator 380. The C2 364 is coupled between a ramp signal Vramp 332 generated by a ramp generator 130 (not shown) and also the positive terminal "+" of the ADC comparator 380. C1 362 is a capacitor with a fixed capacitance. The capacitance value of C2 364 is adjustable and is controlled by the signal lg_en at the output 346 of the G-hat unit 342. The capacitances of C1 362 and C2 364 form a first gain factor GF1 of the gain stage 350. For the circuit shown in FIG. 3A, where the negative terminal "−" of the ADC comparator 380 is coupled to ground through the bypass wire 365, such a GF1 determined to serve the ADC comparator 380 is approximated in proportional to C1/(C1+C2).

As can be seen, a higher gain factor is preferred as a default value for the first gain factor GF1=high when the signal value of V_BL is relatively large (for darker pixel) where V_BL>V_TH. The higher gain factor is preferred to maintain a higher signal-to-noise ratio (SNR) in principle when a darker pixel associates with a weaker signal. When the value of C2 364 is increased, as determined approximately by the C1/(C1+C2) relation, GF1 is reduced from high to low. Here, the increment to the value of C2 364 may be controlled by the signal lg_en=high at the output 346 of the G-hat unit 342, as a result of V_BL<V_TH. The reduction GF1 from high to low is used to guarantees that the upper limit of the analog signal Vin 384 fed into the ADC comparator 380 is not saturated for any pixel signal generated under brighter light, rather, the input amplitude to the ADC 360 is reduced to make sure that the ADC 360 operates in its most favorite input range.

FIG. 3B is a second schematic example of a readout ADC circuit that comprises a G-hat unit 342 and an ADC gain stage 350 in accordance with the teaching of the present disclosure. The gain stage 350 of comprises a first capacitor C1 362, and a second capacitor C3 366. The C1 362 is coupled between the bitline 340 (at the value of V_BL) and a positive terminal "+" of the ADC comparator 380. The C3 366 is coupled between a ramp signal Vramp 332 generated by a ramp generator 130 (not shown) and a negative terminal "−" of the ADC comparator 380. C1 362 is a capacitor with a fixed capacitance. The capacitance value of C3 366 is adjustable and is controlled by the signal lg_en at the output 346 of the G-hat unit 342. The capacitances of C1 362 and C3 364 form a second gain factor GF2 of the gain stage 350. For a circuit shown in FIG. 3B, where a negative terminal "−" of the ADC comparator 380 is coupled through the C3 366 to the ramp signal Vramp 332, such a GF2 determined to serve the ADC comparator 380 is approximated in proportional to C1/C3.

As can be seen, a higher gain factor is preferred as a default value for the second gain factor GF2=high when the signal value of V_BL is relatively large (for darker pixel) where V_BL>V_TH. The higher gain is preferred to maintain a higher signal-to-noise ratio (SNR) in principle when a darker pixel associates with a weaker pixel signal. When the value of C3 366 is increased, as determined by the approximated C1/C3 relation, the gain factor GF2 is reduced from high to low. Here, the increment to the value of C3 366 may be controlled by the signal lg_en=high at the output 346 of the G-hat unit 342, as a result of V_BL<V_TH. The reduction of GF2 from high to low is used to guarantees that the upper limit of the analog signal Vin 384 fed into the ADC comparator 380 is not saturated for pixel signal generated under brighter light, rather, the input amplitude to the ADC 360 is reduced to make sure that ADC 360 operates in its most favorite input range.

FIG. 3C is a third schematic example of a readout ADC circuit that comprises a G-hat unit 342 and an ADC gain stage 350 in accordance with the teaching of the present disclosure. The gain stage 350 of comprises a first capacitor C1 362, a second capacitor C4 368, an operation amplifier (OpAmp) 370, a third capacitor C5 372, a low-gain-enable switch SWen_lg 374, an amplifier reset switch SWamp_rst 376, and a capacitor Cin 378. The C1 362 is coupled between the bitline 340 (at the value of V_BL) and a negative terminal "–" of the OpAmp 370. The C4 368 is coupled between the negative terminal "–" of the OpAmp 370 and the output terminal of the OpAmp 370. The SWen_lg 374 is couple on one terminal to the negative terminal "–" of the OpAmp 370 and the other terminal to a first terminal of the third capacitor C5 372. A second terminal of C5 372 is coupled to an output terminal of the OpAmp 370.

The Cin 378 is coupled between the output terminal of the OpAmp 370 and a positive terminal "+" of the ADC comparator 380. A ramp signal Vramp 332 generated by a ramp generator 130 (not shown) is coupled to a negative terminal "–" of the ADC comparator 380 through a bypass wire 365 of the gain stage 350.

C1 362, C4 368, and C5 372 are capacitors with a fixed values. The capacitance value of C5 372 may be added between the negative terminal "–" and the output terminal 377 of the OpAmp 370, by the signal lg_en at the output 346 of the G-hat unit 342, once the SWen_lg 374 is turned on. The capacitances of C1 362, C4 368, C5 372, and the SWen_lg 374 in FIG. 3C form a third gain factors GF3 of the gain stage 350. When the signal value of V_BL is relatively large (due to a darker pixel) where V_BL>V_TH, SWen_lg 374 remains off, the third gain factor GF3 is approximated in proportional to C1/C4. When the signal value of V_BL is relatively small (caused by a brighter pixel) where V_BL<V_TH, SWen_lg 374 is turned on, FG3 is approximated in proportional to C1/(C4+C5), which is smaller than C1/C4.

As can be seen, a higher GF3 is preferred as a default value for the third gain factor GF3=high to be proportional to C1/C4 when V_BL>V_TH. The higher gain factor is preferred to maintain a higher signal-to-noise ratio (SNR) for a weaker pixel signal. When the capacitance of C5 372 is added by switching on SWen_lg 374 to be in parallel to the capacitance of C4 368, GF3 is reduced from C1/C4 to C1/(C4+C5), as a result of V_BL<V_TH. The reduction of GF3 from high to low is used to guarantees that the upper limit of the analog signal Vin 384 fed into the ADC comparator 380 is not saturated for a pixel signal generated under brighter light (correlated to a lower signal voltage), rather, the input amplitude to the ADC 360 is reduced to make sure that ADC 360 operates in its most favorite input range.

Figure 4:
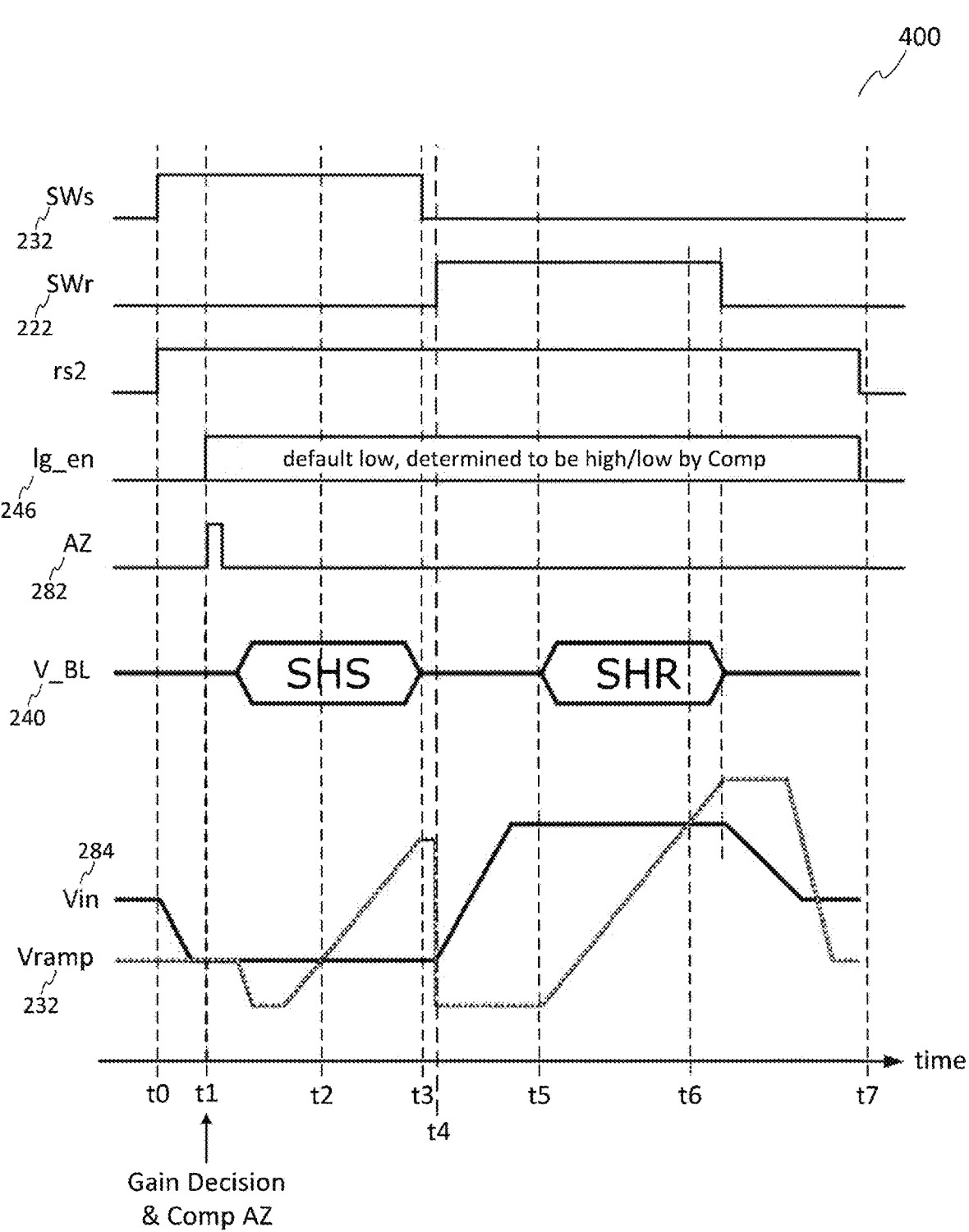
FIG. 4 illustrates example timing diagrams of signals found in an example SH and ADC readout combined circuit with adaptive gain during an image data readout in accordance with the teachings of the present disclosure.

FIG. 4 is a timing diagram 400 to show the operation on how the disclosed G-hat unit 242 controls a gain stage 250 in optimizing the performance of ADC 260 in accordance with the teaching of the present disclosure. In a typical voltage domain global shutter (VDGS) operation, all reset and signal voltages (for correlated double sampling) from a pixel array 102 are first sampled and held into an array of storage capacitors simultaneously, and then read out from those storage capacitors to their corresponding bitlines 240 at later time in a sequential way.

For each pixel cell 204, using a pixel readout circuit 200 of FIG. 2, a reset voltage Vrst has been sampled from a pixel cell 204 and stored into a reset capacitor Cr 224 through a reset access switch SWr 222, and a signal voltage Vsig has been sampled from the pixel cell 204 and stored into a signal capacitor Cs 234 through a signal access switch SWs 232. These steps of "sample and store global shutter Vrst to Cr and Vsig to Cs" in a consolidated form is presented as step 510 in a flow diagram 500 of FIG. 5 for the readout operation of each global shutter pixel 228 in accordance with the teaching of the present disclosure. Next, a readout sequence of Vsig and Vrst as shown as step 520 in FIG. 5 starts to take place.

To start, a second reset (RST2) transistor 226 is pulsed to reset a pixel line voltage V_PIX 208 to a supply voltage SVD. This will put V_PIX 208 at the pixel line connection 206 into its operational condition before time 0. At time t0 as shown in FIG. 4, SWs 232 and a second row select (RS2) transistor 238 are both turned on to route the pre-stored Vsig from Cs 234 to the bitline (BL) 240 so that a BL voltage V_BL=Vsig, as also shown as step 530 in FIG. 5. After a quick settlement period after t0, Vsig on BL 240 is compared with a pre-determined threshold voltage value V_TH 244 by the G-hat comparator 241 as shown as step 540 in FIG. 5.

Figure 5:
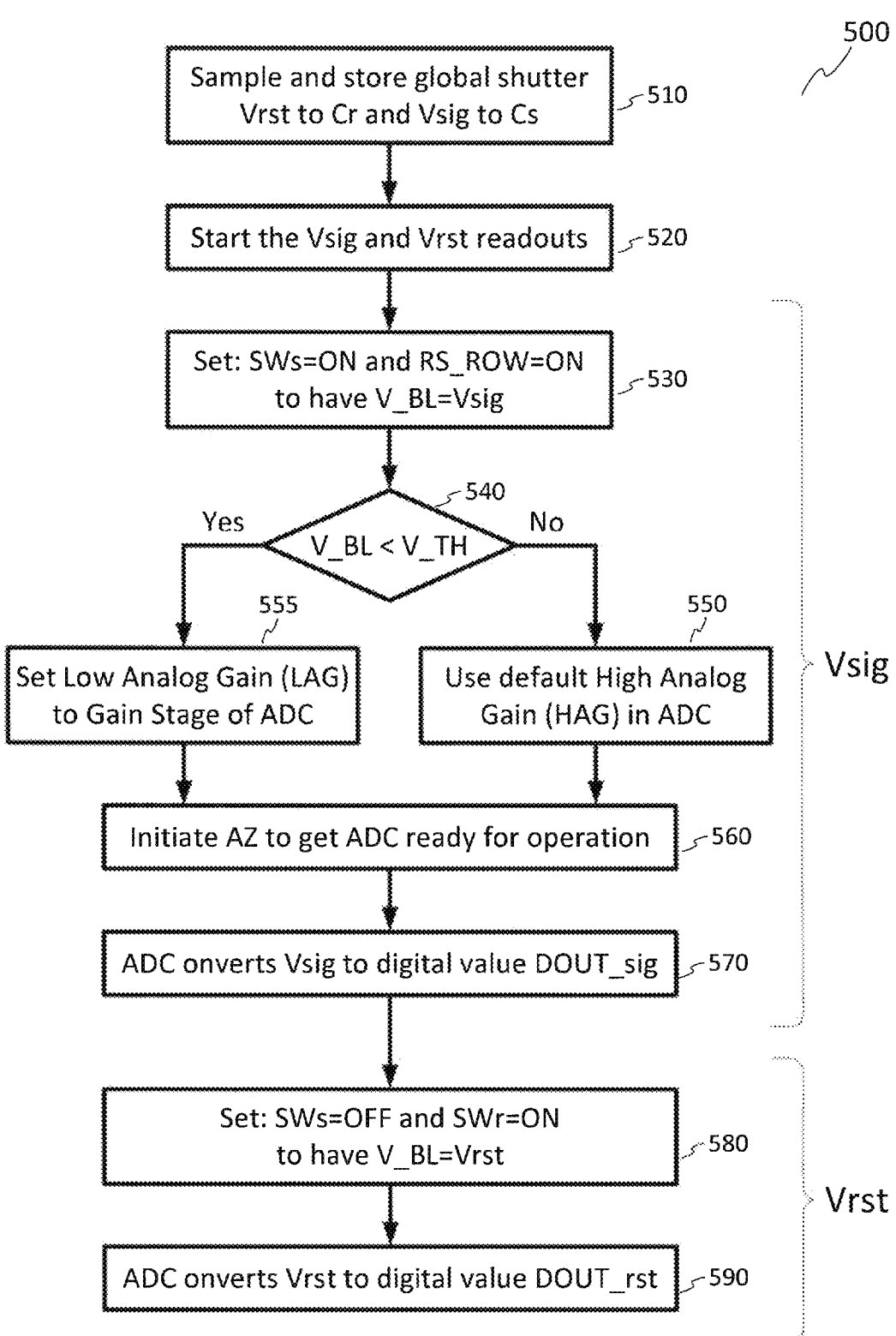
FIG. 5 is a flow chart to demonstrate how the example SH and ADC readout combined circuit with adaptive gain as shown in FIG. 2 operates in coordination with the example timing diagrams as shown in FIG. 4 in accordance with the teaching of the present disclosure.

At time t1, as a first possibility of the scenario, an signal at output 245 of the G-hat comparator 242 is determined to be a low voltage if Vsig>V_TH, after been latched by a G-hat latch 243, an output signal lg_en at output 246 of the G-hat unit 242 is generated to control the gain stage 250 to remain in its default high analog gain (HAG) status as shown as step 550 in FIG. 5. Also at t1, as a second possibility, lg_en latched at output of the G-hat unit 342 is determined to be a high voltage if Vsig<V_TH, which in turn controls the gain stage 250 to change its gain status from a preset high analog gain (HAG) to a low analog gain (LAG) as shown as step 555 in FIG. 5. The change to the LAG is implemented by using one of the gain stage circuit 350 as disclosed among FIGS. 3A, 3B, and 3C. The gain stage 250 may not limited to have only two gain factors to select from, it may take forms of multiple gains. For example, if a gain stage 250 has up to 8 different gain factors to choose from, its multiplexer select signal may contain 3-bit to distinguish among each of the 8 gain factors demanded for the gain stage 250.

Based on the deterministic result of the signal lg_en at output 246 at t1, an auto-zero (AZ) signal 282 is pulsed to reset an ADC comparator 280 of an ADC 260, as shown as step 560 in FIG. 5, to prepare the ADC 260 for its operation.

At t2, when a dynamically ramping up signal Vramp 232 coupled to a negative (inverting) terminal "–" of the ADC comparator 280 crosses a voltage signal Vin 284 from the gain stage 250 at a positive (non-inverting) terminal "+" of comparator 280, a digital value DOUT 292 is latched in an ADC counter 290 as DOUT_sig to represent Vsig. Since at this moment, the very same Vsig used by the G-hat comparator 241 that makes the decision and sets the gain factor of the gain stage 250, is fed into Vin 284 through the gain stage 250 with an updated gain factor as a result of signal lg_en at output 246, an digital value of Vsig converted within its optimized ADC range is achieved as shown as step 570 in FIG. 5.

At t3, SWs 232 is turned off, and V_PIX 208 at the pixel line may be reset to SVD by applying a pulse to the gate of the RST2 transistor 226. At t4, SWr 222 is turned on to route the pre-stored Vrst from Cr 224 to BL 240 so that V_BL=Vrst, as shown as step 580 in FIG. 5. At t5, the voltage signal Vin 284 is stabilized and a new ramp signal Vramp 232 at a negative terminal "–" of the ADC comparator 280 starts to ramp up. At t6, Vramp 232 crosses the Vin 284 at a positive terminal "+" of comparator 280, a digital value DOUT 292 is latched in an ADC counter 290. This DOUT 292 represents a digital value DOUT_rst of Vrst converted by the ADC 260 as shown as step 590 in FIG. 5. At this point both DOUT_rst and DOUT_sig achieved earlier are converted under the same gain to the gain stage 250 set by the signal lg-en at output 246 at the moment of t1. Both DOUT_rst and DOUT_sig may be used for further digital signal processing. A correlated double sampling (CDS) may be performed in the digital domain as digital CDS (DCDS) by subtracting DOUT_rst from DOUT_sig, as commonly practiced for image sensors.

At t7, a full readout cycle of each global shutter pixel 228 based on one exposure of the VDGS is concluded.

The above description of illustrated examples of the invention is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. An adaptive analog to digital converter (ADC) gain controller circuit for use in a Voltage Domain Global Shutter (VDGS) image sensor, comprising:
   a pixel level connection coupled to a pixel cell;
   a reset transistor coupled between a supply voltage and the pixel level connection;
   a source follower transistor having a gate coupled to the pixel level connection;
   a row select transistor coupled between the source follower transistor and a bitline;
   a reset switch transistor coupled to the pixel level connection;
   a reset storage capacitor coupled between the reset switch transistor and ground to receive a reset voltage of the pixel cell;
   a signal switch transistor coupled to the pixel level connection;
   a signal storage capacitor coupled between the signal switch transistor and ground to receive a signal voltage of the pixel cell;
   a G-hat unit coupled to the bitline;
   a gain stage comprising a first input coupled to the bitline, a second input coupled to an output of the G-hat unit, a third input coupled to a ramp voltage, a first output coupled to a positive input terminal of an ADC comparator, a second output coupled to a negative input terminal of the ADC comparator, wherein the gain stage comprises more than one gain factor under control of the second input and a high gain factor serves as its initially default factor; and
   an ADC counter coupled between an output of the ADC comparator and a digital output of the ADC.

2. The adaptive ADC gain controller circuit of claim 1, further comprising:
   a current source coupled between the bitline and ground;

a ramp generator with an output coupled to the third input of the gain stage to supply the ramp voltage;
   a G-hat comparator coupled as an input stage of the G-hat unit, wherein the G-hat comparator with a negative input terminal coupled to the bitline and a positive input terminal coupled to a threshold voltage, and wherein an output of the G-hat comparator is determined to be high if a voltage on the bitline is lower than a voltage of the threshold voltage;
   a G-hat latch coupled as an output stage of the G-hat unit, wherein the output of the G-hat comparator is latched into the G-hat latch under control of a latch enable signal, and wherein an output of the G-hat latch is an output of the G-hat unit; and
   an auto-zero signal coupled to the ADC comparator to preset the ADC comparator.

3. The adaptive ADC gain controller circuit of claim 2, wherein the gain stage comprises:
   a first capacitor coupled between the first input of the gain stage and the first output of the gain stage, wherein the first capacitor is a capacitor with a fixed capacitance;
   a second capacitor coupled between the third input of the gain stage and the first output of the gain stage; and
   a ground coupled to the second output of the gain stage.

4. The adaptive ADC gain controller circuit of claim 3, wherein the second capacitor changes its capacitance under control of the second input, and wherein the variable capacitance of the second capacitor is changed in a way which leads to the reduction of the gain factor of the gain stage from its initially set high value to a lower value if the output of the G-hat unit is determined to be high.

5. The adaptive ADC gain controller circuit of claim 2, wherein the gain stage comprises:
   a first capacitor coupled between the first input of the gain stage and the first output of the gain stage, wherein the first capacitor is a capacitor with a fixed capacitance; and
   a second capacitor coupled between the third input of the gain stage and the second output of the gain stage.

6. The adaptive ADC gain controller circuit of claim 5, wherein the second capacitor changes its capacitance under control of the second input, and wherein the variable capacitance of the second capacitor is changed in a way which leads to the reduction of the gain factor of the gain stage from its initially set high value to a lower value if the output of the G-hat unit is determined to be high.

7. The adaptive ADC gain controller circuit of claim 2, wherein the gain stage comprises:
   a first capacitor coupled between the first input of the gain stage and a negative input terminal of an operational amplifier (OpAmp), wherein the first capacitor is a capacitor with a fixed capacitance;
   a second capacitor coupled between the negative input terminal of the OpAmp and an output terminal of the OpAmp, wherein the second capacitor is a capacitor with a fixed capacitance;
   a third capacitor coupled between the negative input terminal of the OpAmp and an output terminal of the OpAmp, wherein the third capacitor is a capacitor with a fixed capacitance;
   a fourth capacitor coupled between the output terminal of the OpAmp and the first output of the gain stage;
   a gain control switch coupled between the negative input terminal of the OpAmp and the third capacitor; and
   a gain reset switch coupled between the negative input terminal of the OpAmp and an output terminal of the OpAmp to reset the gain stage.

8. The adaptive ADC gain controller circuit of claim 7, wherein the third capacitor is connected in parallel to the second capacitor if the gain control switch is turned on by a high voltage of the second input, and wherein the combined capacitance of the second capacitor and the third capacitor leads to the reduction of the gain factor of the gain stage from its initially set high value to a lower value if the output of the G-hat unit is determined to be high.

9. A method of setting a gain factor adaptively to prepare for an analog-to-digital converter (ADC) operation, comprising:

generating a voltage pulse to turn a reset transistor on and off to reset a pixel line voltage to a supply voltage, after a reset voltage being sampled from a pixel cell and stored into a reset capacitor through a reset access switch firstly and a signal voltage being sampled from a pixel cell and stored into a signal capacitor through a signal access switch secondly;

presetting a gain factor of a gain stage of the ADC to a high value;

turning both the signal access switch and a row select transistor on to read the stored signal voltage from the signal capacitor to a bitline;

setting an output of a G-hat unit to a high voltage if the signal voltage read on to the bitline is determined to be lower than a threshold voltage;

setting the gain factor of a gain stage of the ADC to a low value if the output of the G-hat unit is a high voltage;

generating an auto-zero (AZ) voltage pulse to turn an ADC comparator on and off, to reset the ADC;

receiving the signal voltage from the bitline to couple to an input of the gain stage of the ADC;

converting the signal voltage at the input of the gain stage to a digital signal value by the ADC;

turning the signal access switch off;

turning the reset access switch on to read the stored reset voltage from the reset capacitor to the bitline; and converting the reset voltage at the input of the gain stage to a digital reset value by the ADC.

10. The method of setting a gain factor adaptively to prepare for an ADC operation of claim 9, wherein a reset control signal to control the reset transistor, a reset access switch control signal to control the reset access switch, a signal access switch control signal to control the signal access switch, a row select control signal to control the row select transistor, and the AZ voltage pulse are controlled by a control circuit.

11. A gain adaptive readout circuit for Voltage Domain Global Shutter (VDGS) imaging system, comprising:

a pixel array including a plurality of pixel cells arranged in rows and columns, wherein each of the pixel cells is coupled to generate image charge in response to incident light and to convert image charge into image voltage;

a gain adaptive readout circuit coupled to the pixel array, wherein the gain adaptive readout circuit comprises:

a pixel level connection coupled to a pixel cell;

a reset transistor coupled between a supply voltage and the pixel level connection;

a source follower transistor having a gate coupled to the pixel level connection;

a row select transistor coupled between the source follower transistor and a bitline;

a reset switch transistor coupled to the pixel level connection;

a reset storage capacitor coupled between the reset switch transistor and ground to receive a reset voltage of the pixel cell;

a signal switch transistor coupled to the pixel level connection;

a signal storage capacitor coupled between the signal switch transistor and ground to receive a signal voltage of the pixel cell;

a G-hat unit coupled to the bitline;

a gain stage comprising a first input coupled to the bitline, a second input coupled to an output of the G-hat comparator, a third input coupled to a ramp voltage, a first output coupled to a positive input terminal of an ADC comparator, and a second output coupled to a negative input terminal of the ADC comparator, wherein the gain stage comprises more than one gain factors under control of the second input and a high gain factor serves as its initially default factor; and an ADC counter coupled between an output of the ADC comparator and an digital output of the ADC.

12. The gain adaptive readout circuit for VDGS imaging system of claim 11, further comprising:

a current source coupled between the bitline and ground;

a ramp generator with an output coupled to the third input of the gain stage to supply the ramp voltage;

a G-hat comparator coupled as an input stage of the G-hat unit, wherein the G-hat comparator with a negative input terminal coupled to the bitline and a positive input terminal coupled to a threshold voltage, and wherein an output of the G-hat comparator is determined to be high if a voltage on the bitline is lower than a voltage of the threshold voltage;

a G-hat latch coupled as an output stage of the G-hat unit, wherein the output of the G-hat comparator is latched into the G-hat latch under control of a latch enable signal, and wherein an output of the G-hat latch is an output of the G-hat unit;

an auto-zero signal coupled to the ADC comparator to preset the ADC comparator;

a control circuit coupled to control operation of the pixel array, the gain adaptive readout circuit, the current source, the ramp generator, and the G-hat unit; and a function circuit coupled to the digital output of the ADC to store digital values of the image charge from the pixel array.

13. The gain adaptive readout circuit for VDGS imaging system of claim 12, wherein the gain stage comprises:

a first capacitor coupled between the first input of the gain stage and the first output of the gain stage, wherein the first capacitor is a capacitor with a fixed capacitance;

a second capacitor coupled between the third input of the gain stage and the first output of the gain stage; and a ground coupled to the second output of the gain stage.

14. The gain adaptive readout circuit for VDGS imaging system of claim 13, wherein the second capacitor changes its capacitance under control of the second input, and wherein the variable capacitance of the second capacitor is changed in a way which leads to the reduction of the gain factor of the gain stage from its initially set high value to a lower value if the output of the G-hat unit is determined to be high.

15. The gain adaptive readout circuit for VDGS imaging system of claim 12, wherein the gain stage comprises:

a first capacitor coupled between the first input of the gain stage and the first output of the gain stage, wherein the first capacitor is a capacitor with a fixed capacitance; and a second capacitor coupled between the third input of the gain stage and the second output of the gain stage.

16. The gain adaptive readout circuit for VDGS imaging system of claim 15, wherein the second capacitor changes its capacitance under control of the second input, and wherein the variable capacitance of the second capacitor is changed in a way which leads to the reduction of the gain factor of the gain stage from its initially set high value to a lower value if the output of the G-hat unit is determined to be high.

17. The gain adaptive readout circuit for VDGS imaging system of claim 12, wherein the gain stage comprises:

a first capacitor coupled between the first input of the gain stage and a negative input terminal of an operational amplifier (OpAmp), wherein the first capacitor is a capacitor with a fixed capacitance;

a second capacitor coupled between the negative input terminal of the OpAmp and an output terminal of the OpAmp, wherein the second capacitor is a capacitor with a fixed capacitance;

a third capacitor coupled between the negative input terminal of the OpAmp and an output terminal of the OpAmp, wherein the third capacitor is a capacitor with a fixed capacitance;

a fourth capacitor coupled between the output terminal of the OpAmp and the first output of the gain stage;

a gain control switch coupled between the negative input terminal of the OpAmp and the third capacitor; and a gain reset switch coupled between the negative input terminal of the OpAmp and an output terminal of the OpAmp to reset the gain stage.

18. The gain adaptive readout circuit for VDGS imaging system of claim 17, wherein the third capacitor is connected in parallel to the second capacitor if the gain control switch is turned on by a high voltage of the second input, and wherein the combined capacitance of the second capacitor and the third capacitor leads to the reduction of the gain factor of the gain stage from its initially set high value to a lower value if the output of the G-hat unit is determined to be high.

19. The gain adaptive readout circuit for VDGS imaging system of claim 12, wherein the threshold voltage, the latch enable signal, and the auto-zero signal are under control of the control circuit.

*    *    *    *    *